United States Patent
Chaudhuri et al.

(10) Patent No.: US 7,251,648 B2
(45) Date of Patent: Jul. 31, 2007

(54) AUTOMATICALLY RANKING ANSWERS TO DATABASE QUERIES

(75) Inventors: Surajit Chaudhuri, Redmond, WA (US); Gautam Das, Redmond, CA (US); Aris Gionis, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 10/186,027

(22) Filed: Jun. 28, 2002

(65) Prior Publication Data

US 2004/0002973 A1 Jan. 1, 2004

(51) Int. Cl.
*G06F 17/30* (2006.01)
(52) U.S. Cl. .............................. 707/3; 707/5
(58) Field of Classification Search ............... 707/3, 707/5
See application file for complete search history.

(56) References Cited

U.S. PATENT DOCUMENTS

| | | | | |
|---|---|---|---|---|
| 5,675,819 | A * | 10/1997 | Schuetze | 704/10 |
| 6,012,053 | A * | 1/2000 | Pant et al. | 707/3 |
| 6,370,525 | B1 * | 4/2002 | Kaufman | 707/3 |
| 6,397,211 | B1 * | 5/2002 | Cooper | 707/3 |
| 6,654,739 | B1 * | 11/2003 | Apte et al. | 707/5 |
| 6,801,909 | B2 * | 10/2004 | Delgado et al. | 707/4 |
| 6,862,586 | B1 * | 3/2005 | Kreulen et al. | 707/3 |
| 7,047,242 | B1 * | 5/2006 | Ponte | 707/10 |
| 7,113,943 | B2 * | 9/2006 | Bradford et al. | 707/4 |
| 2003/0061028 | A1 * | 3/2003 | Dey et al. | 704/9 |
| 2004/0002849 | A1 * | 1/2004 | Zhou | 704/4 |

OTHER PUBLICATIONS

R. Agrawal, H. Mannila, R. Srikant, H. Toivonen and A.I. Verkamo: "Fast Discovery of Association Rules", Advances in Knowledge Discovery and Data Mining, 1995, Ch. 12, pp. 307-328.
R. Baeza-Yates and B. Ribeiro-Neto. Modern Information Retrieval, ACM Press, 1999, pp. 1-136, 141-148, 163-189, 207-209, 215-222, 302-308 and 346-363.
T. Bozkaya and M. Ozsoyoglu, "Indexing Large Metric Spaces for Similarity Search Queries", ACM TODS, 1999, pp. 1-32.
J.S. Breese, D. Heckerman and C. Kadie, "Empirical Analysis fo Predictive Algorithms for Collaborative Filtering", 14th Conference on Uncertainty in Artificial Intelligence, 1998.
N. Bruno, L. Gravano, A. Marian, "Evaluating Top-k Queries over Web-Accessible Databases", ICDE 2002.
K. Chakrabarti, K. Porkaew, S. Mehrotra, "Efficient Query Refinement in Multimedia Databases", ICDE 2000, pp. 1-20.
S. Chaudhuri and L. Gravano, "Evaluating Top-k Selection Queries", VLDB 1999.
S. Chaudhuri and V. Narasayya, "Program for TPC-D Data Generation with Skew", http://research.microsoft.com/dmx/AutoAdmin, 1999.

(Continued)

*Primary Examiner*—Don Wong
*Assistant Examiner*—Thanh-Ha Dang

(57) ABSTRACT

A method for automatically ranking database records by relevance to a given query. A similarity function is derived from data in the database and/or queries in a workload. The derrived similarity function is applied to a given query and records it in the database to rank the records. The records are returned in a ranked order.

32 Claims, 7 Drawing Sheets

OTHER PUBLICATIONS

P. Ciaccia. M. Patella and P. Zezula, M-tree: An Efficient Access Method for Similarity Search in Metric Spaces, VLDB 1997.

W. Cohen, "Integration of Heterogeneous Databases Without Common Domains Using Queries Based on Textual Similarity", SIGMOD, 1998.

J. Dougherty, R. Kohavi and M. Sahami, "Supervised and Unspervised Discretization of Continuous Features", ICML 1995.

G. Das, H. Mannila and P. Ronkainen, "Similarity of Attributes by External Probes", pp. 23-29, KDD 1998.

G. Das and H. Mannila, "Context-Based Similarity Measures for Categorical Databases", PKDD 2000.

R. Fagin, "Fuzzy Queries in Multimedia Database Systems", PODS 1998, pp. 1-10.

R. Fagin, A. Lotem and M. Naor, "Optimal Aggregation Algorithms for Middleware", PODS 2001, pp. 1-40.

C. Faloutsos and K-1. Lin., "FastMap: A Fast Algorithm for Indexing, Data-Mining and Visualization of Traditional and Multimedia Databases", pp. 1-25, SIGMOD 1995.

V. Ganti, J. Gehrke and R. Ramakrishnan, "CACTUS-Clustering Categorical Data Using Summaries", KDD 1999.

D. Gibson, J. Kleinberg and P. Raghavan, "Clustering Categorical Data: An Approach Based on Dynamical Systems", pp. 1-22, VLDB, 1998.

S. Guha, R. Rastogi and K. Shim, "ROCK: A Robust Clustering Algorithm for Categorical Attributes", ICDE 2000.

J. Kleinberg, "Authoritative Sources in a Hyperlinked Enviornment", SODA 1998, pp. 1-33.

L. Page, S. Brin, R. Motwani and T. Winograd, "The PageRank Citation Ranking: Bringing Order to the Web", Technical Report, Stanford University, 1998.

Y. Rui, T. Huang and S. Mehrotra, "Content-Based Image Retrieval with Relevance Feedback in Mars", IEEE Conf. on Image Processing, 1997.

P. Resnick and H. Varian, "Recommender Systems", CACM: vol. 40, Issue 3, 1997.

http://www.ics.uci.edu/~mlearn/MLRespository.html, (one page), 1998.

L. Wu, C. Faloutsos, K. Syeara and T. Payne, "FALCON: Feedback Adaptive Loop for Content-Based Retrieval", VLDB 2000.

R. Wilson and T. Martinez, "Improved Heterogeneous Distance Functions", Journal of AI Research, 1997.

L. Wimmers, L. Haas, M. Roth and C. Braendli, "Using Fagin's Alogrithm for Merging Ranked Results in Multimedia Middleware", CoopIS 1999.

G. Zipf, "Human Behavior and the Principle of Least Effort", Addison-Wesley Press, Inc., 1949.

* cited by examiner

AUTOMATICALLY RANKING ANSWERS TO DATABASE QUERIES

TECHNICAL FIELD

The invention relates to the field of database systems. More particularly, the invention relates to a method of automatically ranking answers to database queries.

BACKGROUND OF THE INVENTION

In information or document retrieval (referred herein to as "IR"), a query is applied to a set of documents, such as books or articles, to retrieve relevant documents. Automated ranking of the results of a query is popular in information retrieval. In contrast, database queries return unordered sets of tuples, or require a ranking function to be explicitly specified by the user, e.g., using an ORDER BY clause. It is often impossible for an exploratory user (e.g., a data analyst, or a customer browsing a product catalog) to cope with large unordered result sets. Such a user may not be able to specify an explicit ranking function that is appropriate for the application.

Extracting similarity functions for ranking has been investigated in areas outside database systems. For example, similarity functions have been used for ranking in document or information retrieval. One similarity function used in information retrieval is cosine similarity. In cosine similarity for information retrieval, a document is modeled as a vector of words and the similarity is defined as the dot-product between two documents. Cosine similarity for information retrieval has been enhanced by term frequency-inverse document frequency normalization techniques, which assign different importance to words based on the frequencies of their occurrences within the document collection.

Research in web search engines has influenced ranking techniques. In particular, web search engine research has influenced the analysis of link structures and network topologies in addition to page content.

Existing systems for ranking database queries typically require additional external information, such as user input or training data. Systems referred to as MARS and FALCON employ content-based techniques for retrieval in multimedia databases. In both systems, the user can specify one or more positive examples of objects, and the system attempts to retrieve similar objects through an iterative process of relevance feedback from the user. FALCON differs from MARS in that it generalizes to any metric distance function between objects, while MARS relies on vector spaces. Both systems are primarily designed for numeric multimedia databases, and learn similarity concepts that are used for ranking through relevance-feedback from the user.

D. Wilson and T. Martinez, *Improved Heterogeneous Distance Functions*, Journal of AI Research, 1997 proposes distance functions for heterogeneous data (both categorical and numerical). The methods disclosed by Wilson and Martinez are mostly useful for classification applications and require the data to be accompanied with class labels.

Ranking is an important component in collaborative filtering research, especially in the design of recommender systems. In collaborative filtering, the objective is to predict the utility of items in a database to a particular user based on a database of user preferences. These methods require training data containing queries and their ranked results.

W. Cohen, *Integration of Heterogeneous Databases Without Common Domains Using Queries Based on Textual Similarity*, SIGMOD, 1998 discloses a query language that introduces an operator for textual attributes. The Cohen paper also uses inverse document frequency ideas from information retrieval in a non-ranking application.

Some research has been done on clustering categorical databases based on co-occurrence analysis. The idea of co-occurrence is that two values of a categorical attribute are deemed similar if they often co-occur with the same values of other attributes.

Top-K techniques exist that, given an explicit similarity (or distance) function that satisfies certain monotonic properties, the techniques efficiently retrieve the top-K tuples from a database.

There is a need for a system that automatically extracts an appropriate similarity function from a database, ranks records by relevance to a given query and returns the relevant records in a ranked order.

SUMMARY

The present disclosure concerns a method for automatically ranking database records by relevance to a query. In the method, a similarity function is derived from data in the database and/or a workload of queries. The similarity function is applied to a given query and records in the database to determine a similarity between the given query and the records. The records are ranked based on the similarity between the given query and the records. The records are returned in a ranked order.

In one embodiment, the similarity function is derived from data in the database. One similarity function that is derived from data in the database is cosine similarity. Another similarity function that is derived from data in the database corresponds to an inverse frequency of attribute values in records of the database. This similarity function may correspond to an inverse frequency of categorical attribute values in records of the database and an inverse frequency of numeric attribute values that is determined by considering a frequency of numeric attribute values specified in the given query and nearby numeric attribute values in the database. In one embodiment, cosine similarity and inverse frequency similarity are combined in the similarity function.

In one embodiment, the similarity function or a portion of the similarity function is derived from a workload of queries. One similarity function that is derived from a workload of queries corresponds to a frequency an attribute value is specified in queries in a workload. This similarity function may correspond to a frequency a categorical attribute value is specified in queries in a workload and a frequency a numeric attribute value and nearby numeric attribute values are specified in queries in the workload.

In one embodiment, the similarity function is a combination of a data derived similarity function and a workload derived similarity function. For example, the similarity function may correspond an inverse frequency of attribute values in the database and a frequency an attribute value is specified in workload queries.

In one embodiment, the similarity function assigns an importance weight to an attribute based on a frequency at which the attribute is specified by queries in the workload.

In one embodiment, the similarity function may consider missing attributes when ranking records. A data derived similarity function may rank a first record having the same similarity score as a second record higher than the second record when values in the first record for attributes that are not specified in the given query occur more frequently in the database than corresponding attribute values in the second record. A workload derived similarity function may rank a first record having the same similarity score as a second record higher than the second record when values in the first record for attributes that are not specified in the given query occur more frequently in the workload queries than corresponding attribute values in the second record.

In one embodiment, the method ranks the records in the database table when no query conditions are provided. In this embodiment, a frequency of occurrence of attribute values in the database and/or the workload is determined. Records that include attribute values that frequently occur in the database and/or the workload are ranked higher than records that include attribute values that occur rarely in the database. The records are returned in ranked order.

The disclosed method may process inflexible or flexible queries. In one embodiment, the method filters the returned records using a given query when a condition of the given query includes an inflexible condition to remove records that do not satisfy the inflexible condition.

In one embodiment, database records and the similarity function are provided to a top-K algorithm that returns a top-K number of records in ranked order. The top-K algorithm may be a threshold algorithm.

DETAILED DESCRIPTION OF THE INVENTION

Figure 4:
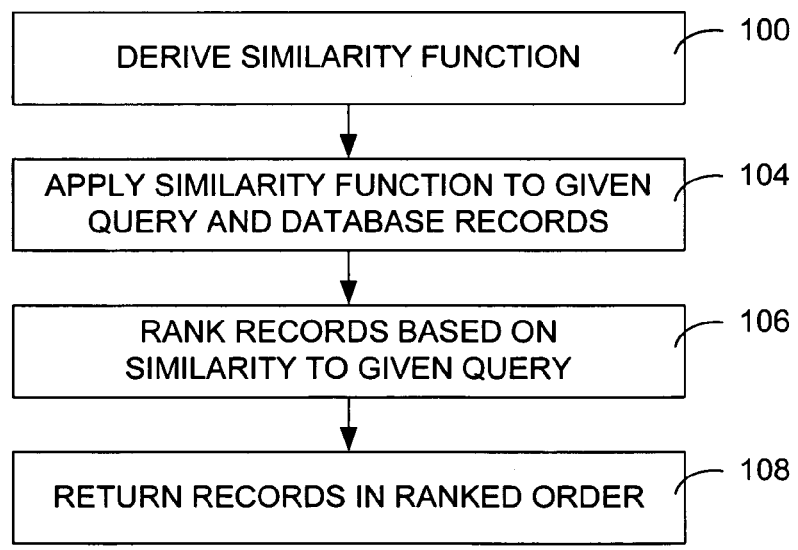
FIG. 4 is a flow chart that illustrates a method of ranking database records.

The present disclosure concerns a method for automatically ranking database records by relevance to a query. Referring to FIG. 4, in the method a similarity function is derived 100 from data in the database 18 and/or queries in a workload 102. The similarity function is applied 104 to a given query and records in the database to determine a similarity or relevance between the given query and the records. The records are ranked 106 based on the similarity between the given query and the records. The records are then returned 108 in ranked order.

Exemplary Environment for Practicing the Invention

Figure 2:
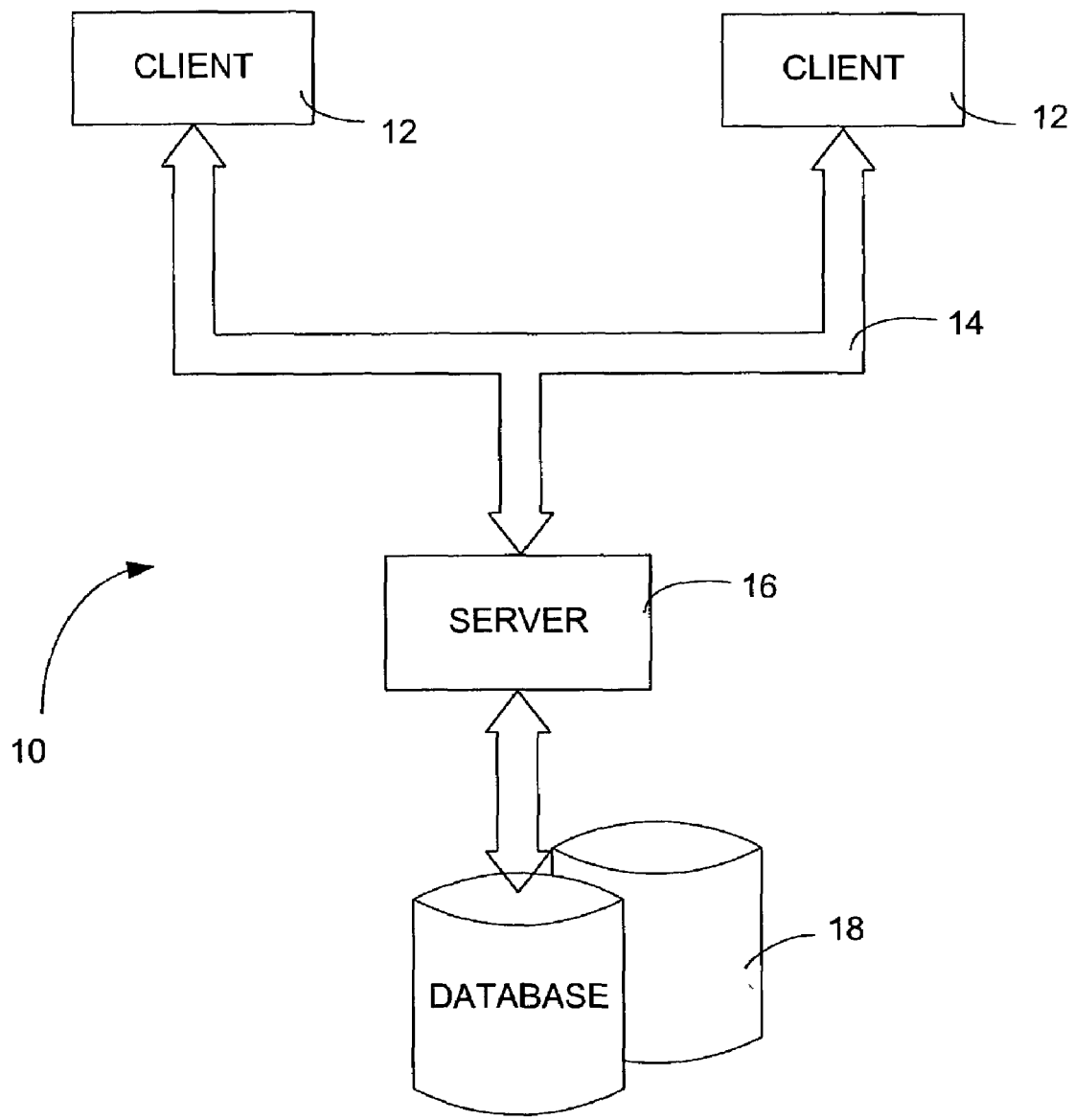
FIG. 2 illustrates a database system suitable for practice of an embodiment of the present invention.

FIG. 2 illustrates an example of a suitable client/server system 10 for use with an exemplary embodiment of the invention. The system 10 is only one example of a suitable operating environment for practice of the invention. The system includes a number of client computing devices 12 coupled by means of a network 14 to a server computer 16. The server 16 in turn is coupled to a database 18 that is maintained on a possibly large number of distributed storage devices for storing data records. The data records are maintained in tables that contain multiple number of records having multiple attributes or fields. Relations between tables are maintained by a database management system (DBMS) that executes on the server computer 16. The database management system is responsible for adding, deleting, and updating records in the database tables and also is responsible for maintaining the relational integrity of the data. Furthermore, the database management system can execute queries and send snapshots of data resulting from those queries to a client computer 12 that has need of a subset of data from the database 18.

Data from the database 18 is typically stored in the form of a table. If the data is "tabular", each row consists of a unique column called "case id" (which is the primary key in database terminology) and other columns with various attributes of the data.

Computer System

Figure 1:
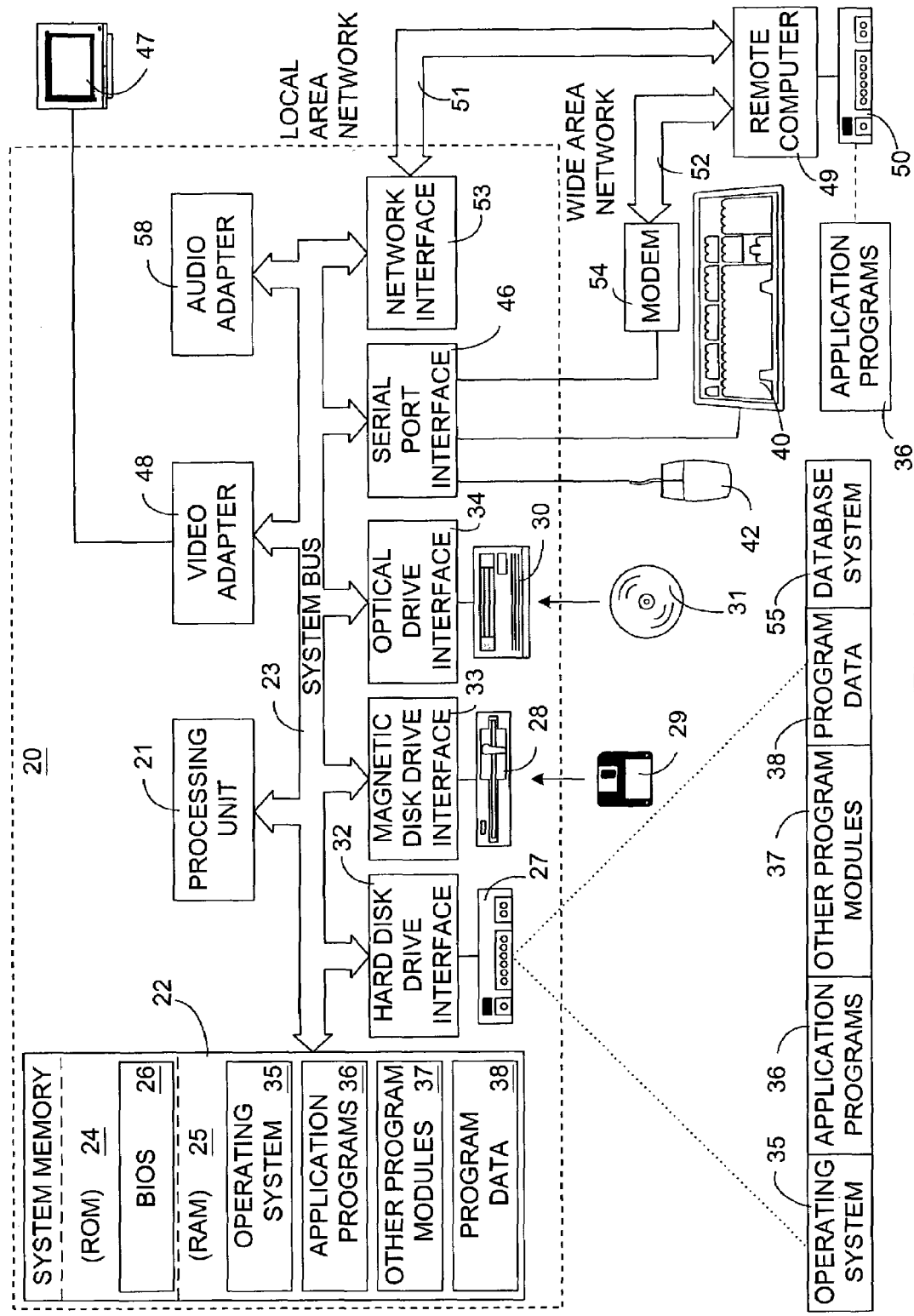
FIG. 1 illustrates an operating environment for estimating a result to an aggregate query on a database by executing the query on a sample that has been constructed to minimize error over an expected workload.

With reference to FIG. 1 an exemplary embodiment of the invention is practiced using a general purpose computing device 20. Such a computing device is used to implement both the client 12 and the server 16 depicted in FIG. 2. The device 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Overview of Automated Ranking of Answers to Database Queries

Ranking and returning the most relevant results of a query is a popular paradigm in information retrieval. In contrast, current database query languages either return unordered sets of tuples, or require a ranking function to be explicitly specified. This disclosure discloses several approaches that enable automatic ranking in databases, including adaptations of known techniques from other domains such as information retrieval. This disclosure discusses a novel technique that analyzes database content and usage patterns to automatically extract an appropriate similarity function between queries and tuples of the database, which is then used for ranking. Results of experiments are included to demonstrate the quality and efficiency of the disclosed ranking techniques.

The following example illustrates the need for a system that automatically ranks the result set and returns the relevant tuples in a ranked order.

EXAMPLE 1

Consider a realtor database that contains homes for sale. A prospective buyer may wish to post a query to retrieve homes for sale in Cincinnati that have 4 bedrooms and are between 2000-3000 sq-ft. Since this may represent median homes, the number of homes returned could be potentially overwhelming. In such a situation, it may be more appropriate to return, say the top twenty homes ranked according to an appropriate notion of relevance determined by the system (e.g. a combination of sq-ft, bedrooms and perhaps even other attributes not mentioned by the user).

In one embodiment, the disclosed method for automated ranking ranks records in a database when a database query results in no answers. In such a case, by ranking the tuples in a database by their similarity to the given query, the system could produce the best candidates for an approximate match.

Preprocessing—Deriving Similarity Function

Figure 3:
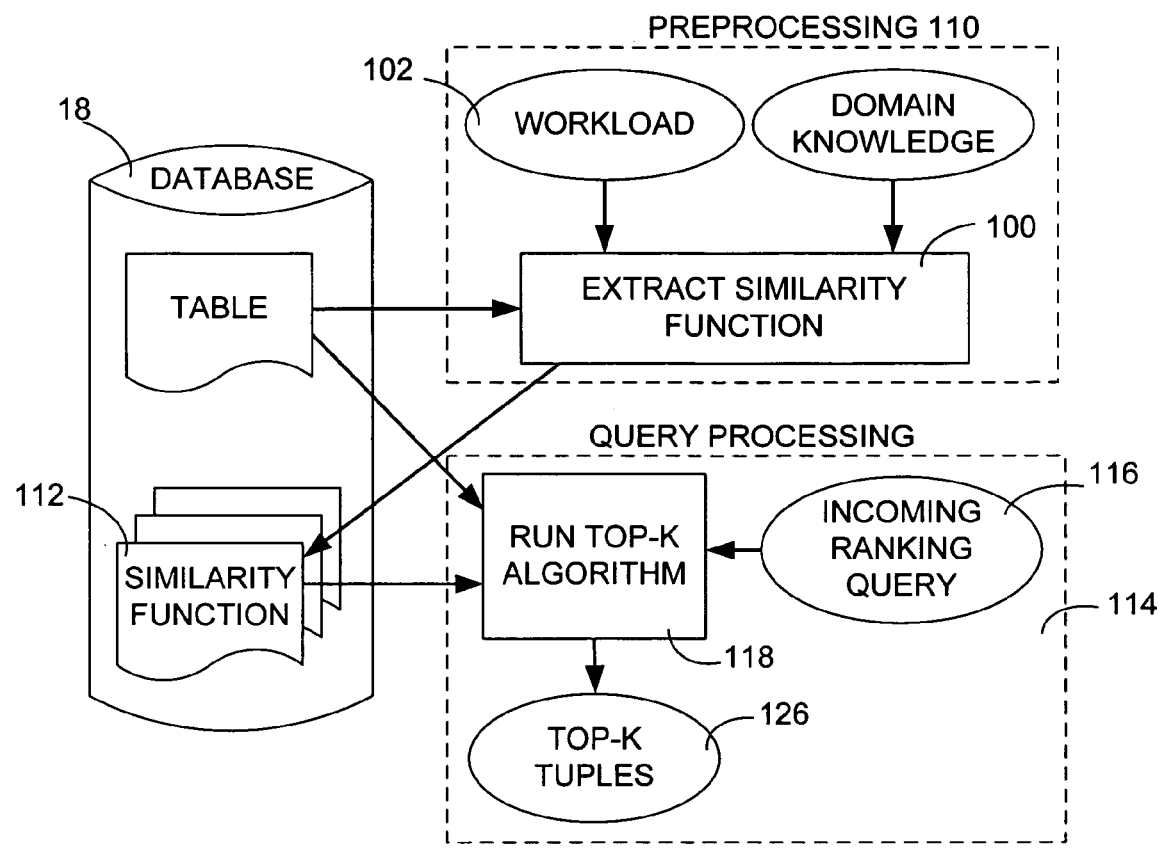
FIG. 3 is a block diagram of a database system depicting a preprocessing module that extracts a similarity function and a query processing module that returns records in a ranked order in accordance with an embodiment of the present invention.

This disclosure discloses a method of automatically ranking answers to database queries. In the method a similarity is automatically derived and used to rank answers to queries. The similarity function may be derived from data in the database, queries in a workload, or a combination of the two. Referring to FIG. 3, a similarity function is derived in a preprocessing module 110 in the exemplary embodiment Inverse document frequency (IDF) is a data derived function that has been used in information retrieval to suggest that commonly occurring terms convey less information about a user's needs than rarely occurring words, and the commonly occurring words should be weighted less during ranking. In one embodiment, inverse document frequency is adapted to handle a mix of categorical and numerical data to be applicable for databases. An IDF Similarity algorithm is disclosed that adapts IDF for answering database queries.

Relative frequency of an item itself is not the only criteria that may affect ranking of tuples. In one embodiment, information on user interaction with the system is recognized as a criteria for ranking tuples. This information may be in the form of a workload of queries. For example, a book may be ranked higher in an answer set if many users tend to view the details of the book even if the database may not have explicit information that recognizes the reason for the popularity. In one embodiment, the disclosed method records the workload (queries) asked against the database system. The workload information can help determine the frequency with which database attributes and values are referenced and may be used to determine the similarity between a query and a record. This is referred to as query frequency similarity (QF) in this disclosure. In one embodiment, a query frequency algorithm is an extension to the inverse document frequency algorithm. In this embodiment, query frequency similarity is used to determine the frequency of usage of attribute values in workload queries to modulate the ranking process produced by the inverse document frequency similarity algorithm. For example, if a particular value is frequently referenced in queries in the workload, it may be weighted more during ranking.

Both the inverse document frequency similarity and query frequency similarity require preprocessing of information in the database that can be done efficiently. IDF and QF use information that is readily available at the database server during traditional query processing.

Problem Formulation

In one embodiment, ranking is performed over a database with a single table R. In this embodiment, the words table and database may be used interchangeably. A table R may have categorical and numerical attributes $\{A_1, \ldots, A_m\}$ and tuples or records $\{t_1, \ldots t_n\}$. $V_k$ is defined to be the set of valid values of attribute $A_k$, that is, $V_k$ is a set of values for categorical attributes, or a continuous range for numerical attributes. In this disclosure, a tuple t is expressed as $t=<t_1, \ldots, t_m>$ for a tuple with values $t_k \in V_k$ for each k.

This disclosure deals with selection queries but allows a subset of the selection conditions in the query to be designated as flexible in the exemplary embodiment. In contrast, for traditional selection queries all conditions in the query are inflexible. In the exemplary embodiment, the disclosed method seeks the Top-K answers. However, in traditional Top-K queries, an ORDER BY clause specifies the ordering function. In contrast, the disclosed method for returning the Top-K queries does not require an ORDER BY clause. Instead, the system uses automated ranking to determine the top K tuples to be returned.

In the exemplary embodiment, even if none of the conditions are specified as flexible, when the answer set is large, the answer set that satisfies the inflexible constraints is ordered. If flexible constraints are present and no tuples satisfy all the flexible conditions, the system will return the K tuples that are most relevant by the systems automated criteria although the tuples do not satisfy all the selection conditions. For example, suppose a user asks for homes with price=$300 k in a realtor database. There may not be a single home at exactly that price. However it is useful to return homes with prices close to $300 k.

While in principle the selection conditions can be arbitrarily complex, in one embodiment certain simplifications made. In one embodiment, the method assumes a class of selection conditions, which are referred to as conjunctive conditions (C-conditions). In this disclosure, these conditions are of the form "WHERE $C_1$ AND ... AND $C_k$", where each $C_i$ is of the form "$A_i$ IN $\{value_1, \ldots, value_k\}$" for categorical attributes $A_i$, and "$A_i$ IN [lb, ub]" for numerical attributes $A_i$. C-conditions are expressive enough to be very useful. For example, the query in Example 1 can be expressed using a C-condition.

Ranking via Similarity Functions:

In information retrieval, similarity functions are used to determine a similarity between queries and documents. In the exemplary embodiment, a similarity function is used to determine a similarity between queries and tuples.

In the exemplary embodiment, similarity coefficients and attribute weight are defined and used to define a similarity function. Consider an attribute $A_k$. For all pairs of values u and v in $V_k$, let the quantity $S_k(u,v)$ represent the "similarity" between u and v. In the exemplary embodiment, the similarity between two attribute values is between 0 and 1.0 implies the two values are completely dissimilar while 1 implies the two values are completely similar. The quantities $S_k(\ )$ are referred to as similarity coefficients in this disclosure. $w_k$ represents the "importance" of attribute $A_k$. For illustrative purposes, assume that $0 \leq w_k \leq 1$ and $\Sigma w_k = 1$. The quantities $w_k$ are referred to as attribute weights. In the exemplary embodiment, the similarity function is the sum of the weighted similarity coefficient for each of the attributes specified by a given query.

EXAMPLE 2

Consider the values AUDI and BMW of the attribute MFR in an automobile database. The similarity coefficient between the two values may be, say 0.8 since both cars are German brands, are targeted to the same market segment, and have similar features and comparable price ranges. The weight of attribute MFR may be 0.6 while the weight of attribute COLOR may be 0.1, since the former is perhaps more important than the latter for ranking purposes.

Figure 5:
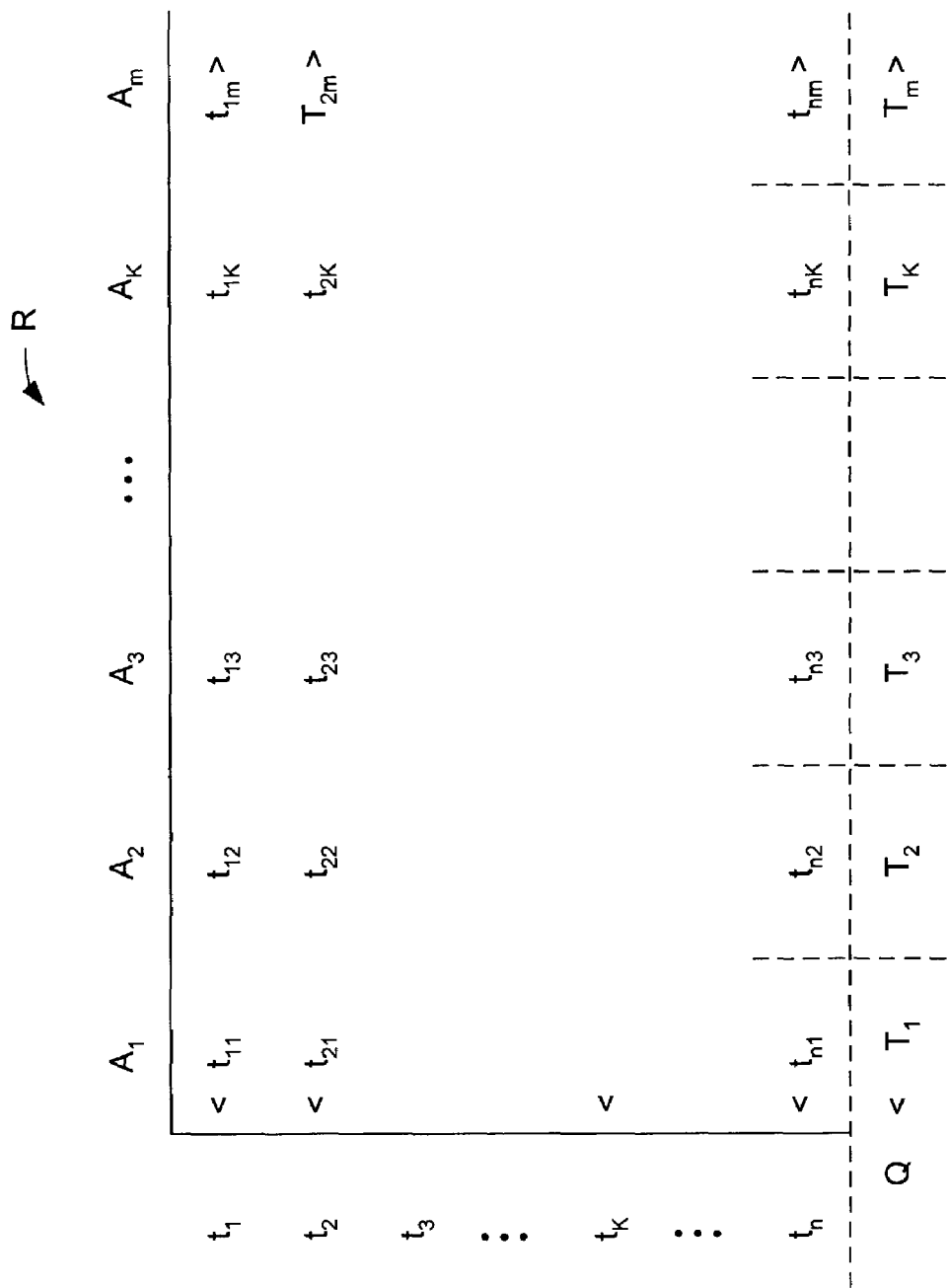
FIG. 5 is an illustration of a database table with attributes shown in alignment with constraints of a given conjunctive condition query.

For illustrative purposes, assume that all the similarity coefficients and attribute weights have been completely specified (in fact, doing this automatically is accomplished by the disclosed method). FIG. 5 and the following explanation show how tuples and queries are composed to define the similarity function SIM(t,Q) between a query Q and a tuple t.

Let $t=<t_1, \ldots, t_m>$ be any tuple. Let query Q have a conjunctive condition of the form "$C_1$ AND ... AND $C_m$", where each $C_k$ is of the form "$A_k$ IN $T_k$", where $T_k$ is a set of constraints on values for categorical attributes, or a range [lb,ub] for numeric attributes. We can thus view Q as a "vector" v of sets of values, i.e. $Q=<T_1, \ldots, T_m>$. FIG. 5 shows a table R with attributes $<A_1, \ldots, A_m>$ and a query Q having a selection condition with the set of values $<T_1, \ldots, T_m>$ shown in alignment with attributes $<A_1, \ldots, A_m>$. Each $T_k$ corresponds to an attribute $A_k$. In the exemplary embodiment, the similarity between t and Q is defined as shown in Equation (1).

$$SIM(t, Q) = \sum_{k=1}^{m} w_k \min_{v \in T_k} \{S_k(t_k, v)\} \quad (1)$$

Note that SIM( ) is also between 0 and 1 in the illustrated embodiment. The similarity between a tuple and a query is a linear combination of the minimum similarity coefficients between attribute values of the tuple and the corresponding set of attribute values of the query. The similarity function provides a way to rank results of queries with conjunction conditions. In the exemplary embodiment, the tuples are sorted by decreasing similarity from Q and the top K tuples are returned The conjunctive condition is used as a filter if the condition is inflexible.

Effect of Missing Attributes:

In most real queries it is unlikely that all attributes of the Table R are specified in the selection condition. For example, in the realtor database in Example 1, the user has not specified conditions on attributes such as price and location. These are referred to as missing attributes of the condition. In one embodiment, the similarity calculations are restricted to only the attributes specified by the query, i.e., only the projection of the database on the columns that are referenced in the query is considered. In one embodiment, when multiple tuples have the same similarity score the method uses missing attributes to break ties.

Overview of Similarity Extraction Techniques

The disclosed ranking algorithms may be differentiated based on the information they exploit for automated ranking. The disclosed ranking algorithms fall into the following categories.

Data-Only Techniques: These techniques assume that other than the raw database, no further information is available. In such circumstances, a ranking method from other domains can be adopted. For example, information retrieval techniques of cosine similarity could be adopted.

Workload Analysis: The use of workload (past queries in one embodiment) can provide valuable information for improving ranking techniques.

Use of Domain Knowledge: If available, explicit knowledge (such as through a domain expert or knowledge of the physical database design) can be used to specify or derive similarity functions.

FIG. 3 illustrates the architecture of the disclosed ranking system. Note that one output of the preprocessing component 110 is the similarity function 112, which is represented in auxiliary database tables. A query processing component 114 takes an incoming query 116 and applies 118 a top-K algorithm and the similarity function 112 to rank and retrieve 126 the top-K tuples most similar to the query. Note that although for FIG. 3 shows domain knowledge, the disclosed algorithms may rely only on data and/or the workload.

Data-Only Similarity Functions

One function that may be used to automatically rank query results is inverse document frequency similarity (IDF). An algorithm that extracts a similarity function using IDF only requires the database as input.

In one embodiment, IDF similarity is based on the information retrieval technique of cosine similarity with term frequency-inverse document frequency (TF-IDF) scalings. One such technique that can be used is disclosed in R. Baeza-Yates and B. Ribeiro-Neto, *Modern Information Retrieval*, ACM Press, 1999. In information retrieval, given a vocabulary of m words, a document (such as an article, a book, or this patent disclosure) is treated as an m-dimensional vector, where the ith component is the frequency of occurrence (also known as term frequency, or TF) of the ith vocabulary word in the document. The cosine similarity between two documents is defined as the dot-product of the two corresponding vectors (normalized so that the similarity is between [0, 1]). The cosine similarity can be further refined by scaling each component with the inverse document frequency (IDF). IDF has been used in information retrieval to suggest that commonly occurring terms convey less information about user's needs than rarely occurring words, and the commonly occurring terms should be weighted less.

In one embodiment, IDF is adapted to rank query results by treating each tuple as a small document. For illustrative purposes, only categorical databases are considered first. In the similarity formula, each $w_k$ is set to be $1/m$, i.e. the contribution of each attribute is the same. In ranking of query results, term frequency is irrelevant since each tuple is treated as a small document in which a word, i.e. a <attribute, value> pair can only occur once. In one embodiment, for every attribute value u of attribute $A_k$, $RF_k(u)$ is set to the raw frequency of u, i.e. the number of tuples in the database that have value u in column $A_k$. In a manner similar to the way IDF is defined in information retrieval, the disclosed method defines $IDF_k(u)$ as $\log(n/RF_k(u))/\log n$, where n is the number of tuples in the database. It should be readily apparent to those skilled in the art that other functions could be used. Thus if u is a frequently occurring value, then $IDF_k(u)$ is small. For categorical data, $S_k(u, v)$ is set to $IDF_k(u)$ if u=v, and 0 otherwise where V is the attribute value specified by the query for attribute $A_k$. In the exemplary embodiment, the value of $S_k(u,v)$ is always between 0 and 1.

Extensions of IDF Similarity for Numeric Data

In addition to categorical data, most databases also contain numeric attributes as well. For illustrative purposes, cosine similarity is considered without IDF scaling. One strategy for handling numeric data is to treat each numeric value as a distinct categorical value, thereby setting $S_k(u,v)$ to 1 if u=v, and 0 otherwise. This definition will however perform badly in most scenarios, since two numerical values might be very close but not actually equal. In one embodiment, the disclosed method solves this problem. One approach is to discretize the domain of a numerical attributes $A_k$ into buckets using any standard 1-dimensional bucketing algorithm (e.g. equi-width or equi-depth bucketing) and treat the values in each bucket the same, effectively treating a numerical attribute as categorical. Bucketing and other discretization algorithms for numeric attributes has been investigated for other applications that require discretization. For example, J. Dougherty, et al; *Supervised and Unsupervised Discretization of Continuous Features*, ICML 1995 discloses use of bucketing for classification problems. Most bucketing approaches are problematic since inappropriate bucket boundaries may separate two values that are actually close to each other, determining the correct number of buckets is not easy, and values in different buckets are treated as completely dissimilar, regardless of the actual distance separating the buckets.

One solution that avoids discretization and its associated problems is to define $S_k(u,v)=1-d/|u_k-l_k|$ where $d=|v-u|$ is the distance between the value V specified by a given query and the attribute value U for a particular record, and $[l_k, u_k]$ is the domain of $A_k$. However, this definition requires that the domain of $A_k$ be a fixed bounded range, which is unrealistic for many numeric attributes.

Another definition of similarity is as follows. Let $\sigma$ be the standard deviation of all values of $A_k$ in the database. In the exemplary embodiment, the similarity definition achieves the following: if $d \to \infty$, then $S_k(u,v) \to 0$; if $d=0$ then $S_k(u,v)=1$; and if $d=\sigma$ then $S_k(u,v)=0.5$. These conditions are met by defining $S_k(u,v)=1/(d/\sigma+1)$ in one embodiment.

Of course, this is by no means the only possible definition of similarity for numerical attributes. Similarity definitions that are more closely tied to the distribution of the numerical values (and not just to the standard deviation) may be more accurate. The disclosed approach is simple, efficient, and performs well.

In the exemplary embodiment, IDF scaling is extended to numerical attributes. As with the cosine similarity, the problem is that it is quite likely that each numeric value in the database is unique, so its frequency becomes meaningless. In one embodiment, this problem is overcome by counting the frequency of a numeric value by also taking into account nearby values.

Let the values of the numeric attribute $A_k$ in the database be $\{t_{1,k}, t_{2,k}, \ldots, t_{n,k}\}$. Let $WF_k(t_{i,k})$ be defined as a weighted frequency, i.e. $WF_k(t_{i,k}) = \Sigma_{1 \leq j \leq n} 1/(|t_{i,k}-t_{j,k}|/\sigma+1)$. Each other value contributes to the frequency of $t_{i,k}$, except that less similar values contribute less to the frequency. In this embodiment, the IDF is defined using WF instead of raw frequency (RF). That is, $IDF_k(t_{i,k})=\log(n/WF_k(t_{i,k}))/\log n$. $S_k(t_{i,k}, t_{j,k})$ is defined as:

$$S_k(t_{i,k}, t_{j,k}) = \frac{1}{\left(\frac{d}{\sigma}+1\right)} IDF_k(t_{j,k})$$

In the above definition, $t_{i,k}$ comes from the tuple, while $t_{j,k}$ comes from the query. The method scaled the previous definition of similarity between numeric values by the IDF of the value that comes from the query. Note that in the limit when $t_{i,k}$ is very close to $t_{j,k}$, $S_k(t_{i,k}, t_{j,k})$ degenerates to $IDF_k(t_{j,k})$, which is exactly the formula in the case of categorical attributes.

Missing Attributes

Suppose the query Q has several missing attributes. To distinguish between multiple tuples having the same similarity score, the disclosed method uses the values of these missing attributes. This can be difficult, since the algorithm has no way of knowing what the user's preferences for the missing attributes are. In the exemplary embodiment, tuples are ranked higher if their missing attribute values are more "popular", i.e. occur more frequently in the database. For example, when querying a realtor database, if no conditions are specified on the location attribute, then to break ties the algorithm will rank homes that are found in the most common neighbourhoods higher.

For illustrative purposes, let document or record frequency $DF_k(u)$ be defined as $WF_k/n$. For each tied tuple t, we use the sum of $DF_k(t_k)$ over all missing attributes $A_k$ to rank t (the larger the sum, the higher the rank).

In one embodiment, this approach can be used to rank a database without specifying any selection condition; i.e. all attributes are missing. In other words, the disclosed method defines a global static ranking of all the tuples in the database. In the case of the realtor database, this approach would assign higher ranks to houses that have the most common number of bedrooms, most common locations, etc, and assign lower ranks to houses with unusual characteristics, such as extremely high prices, or strange locations.

Workload Similarity Techniques

The disclosed IDF similarity function is a simple and practical approach for deriving a similarity function for ranking tuples of most databases. However, as the following examples show, there are certain situations in which more sophisticated similarity functions are desirable.

EXAMPLE 3

Consider a database having two columns: MFR and CAR_TYPE. Suppose a customer is searching for the tuple <NISSAN, SUV>, which is unavailable in the database. It is likely that this customer is more likely to be interested in other SUVs rather than in other car types by NISSAN, even though the IDF of SUV may be less than the IDF of NISSAN (since SUV is a popular car type out of only a few car types, whereas there are many car manufacturers).

In general, a data value may be important irrespective of its frequency of occurrence in the database. As another example, an author is popular for reasons other than the number of books she/he has written.

EXAMPLE 4

Consider a database having the following columns: MFR, MODEL, COLOR, DOORS. The two tuples <CAMRY, TOYOTA, BLUE, 4> and <ACCORD, HONDA, GREEN, 4> have very few elements in common, and will appear very dissimilar as measured by a cosine similarity function (with or without IDF scaling). However, if it were known that the values HONDA and TOYOTA are actually quite similar since they are Japanese car manufacturers, and that CAMRY and ACCORD are quite similar since they are family sedans, we would conclude that the two tuples are quite similar.

These problems can be solved by a domain expert who can define a more accurate similarity function (e.g. by giving more importance to SUV over NISSAN). However, this can be highly dependent on the application at hand. In the exemplary embodiment, the similarity function is improved automatically by analyzing other more easily available knowledge sources, such as past usage patterns of the database (i.e. workload). Such approaches might not be as precise as a similarity function obtained using domain knowledge, but they are much more general. This disclosure discloses a query frequency (QF) algorithm, that may be used as an extension to the disclosed IDF similarity algorithm In the exemplary embodiment, the disclosed QF similarity algorithm is an extension to the IDF Similarity algorithm. However, it should be readily apparent to those skilled in the art that the disclosed query frequency similarity algorithm can be used as a stand alone similarity measure for ranking. The query frequency algorithm uses workloads to improve the precision of the IDF similarity function, and the ranking quality. In one embodiment, a workload of q queries $W=\{Q_1, Q_2, \ldots, Q_q\}$ is available. The disclosed query frequency algorithm does not require as inputs both workload queries and their correctly ranked results. Getting correctly ranked results for workload queries is tedious and involves user feedback, whereas gathering only the queries is relatively easy since profiling tools exist on most commercial DBMS that can log each query string that is executed on the system.

The idea behind query frequency similarity is that in addition to their inverse document frequency, the importance of attribute values is directly related to the frequency of their occurrence in query strings in the workload. Example 3 illustrates this point. It is reasonable that there are more queries that contain the term SUV (since SUV is a very popular car type) than the term NISSAN (since there are many other popular car manufacturers). The disclosed query frequency algorithm takes advantage of this observation by recording the frequency of attribute values appearing in the workload, and then using similarity coefficients proportional to the frequencies.

Query Frequencies of Attribute Values

For illustrative purposes, initially assume only categorical data. Numeric data is disclosed in the following section. Let $RQF_k(u)$ be the raw frequency of occurrence of value u of attribute attribute $A_k$ in the query strings of the workload. Let $RQFMax_k$ be the raw frequency of the most frequently occurring value of $A_k$ in the workload. Let the query frequency, $QF_k(u)$ be defined as $(1+RQF_k(u))/(1+RQFMax_k)$. In this embodiment, the similarity coefficient $S_k(u,v)$ is defined as $QF_k(u)*IDF_k(u)$ if u=v, and 0 otherwise.

The QF query frequency extension resolves the problem in Example 3. Although $IDF_k(NISSAN)$ may be more than $IDF_k(SUV)$, this can be corrected by the fact that $QF_k(NISSAN)$ may be smaller than $QF_k(SUV)$.

The QF similarity coefficients could be proportional to some other increasing function of the frequencies, such as log. In the exemplary embodiment, the QF frequencies are used directly. In the disclosed query frequency definition, 1 is added to the raw frequency so that the similarity coefficients of values that do not appear at all in the workload still have the IDF component, and the query frequencies are normalized by dividing by $RFMax_k+1$, thus the similarity is between 0 and 1.

Similarity between Different Attribute Values

In situations, such as the situation illustrated by Example 4 automatic ranking is difficult. If attribute values are different, increasing/decreasing their importance (either by scaling with IDF only, or with QF*IDF) does not facilite ranking. For example, $S_k$(TOYOTA,HONDA)=0 with or without such scalings. In information retrieval, there are fairly sophisticated data-only methods that can help derive such similarities. One such method is as co-occurrence analysis.

In one embodiment, an approach of determining similarity between different attribute values that leverages workload information is used. In this embodiment, the method assumes that if certain pairs of values $t_{i,k}$<>$t_{j,k}$ often "occur together" in the workload, they are similar to each other. For example, there may be queries with clauses such as "MFR IN {TOYOTA, HONDA, NISSAN}". Or, perhaps there have been several recent queries in the workload by a specific user who has repeatedly referenced Japanese car manufacturers. Such workloads point to evidence that these car manufacturers are more similar to each other than to, say AUDI. In one embodiment, similarity is determined by leveraging sets of values that occur in IN clauses.

For illustrative purposes, let $W(t_{i,k})$ be the subset of queries in workload W in which $t_{i,k}$ occurs in an IN clause. The definition of the similarity coefficient may be the set similarity (or Jaccard coefficient) between $W(t_{i,k})$ and $W(t_{j,k})$, i.e.

$$S_k(t_{i,k}, t_{j,k}) = J(W(t_{i,k}), W(t_{j,k})) = \left| \frac{W(t_{i,k}) \cap W(t_{j,k})}{W(t_{i,k}) \cup W(t_{j,k})} \right|$$

In the exemplary embodiment, this is scaled by QF and IDF. In this embodiment, a weighted version of QF is:

$$QF_k(t_{i,k}) = \sum_{j=1}^{n} J(W(t_{i,k}), W(t_{j,k})) \cdot \left( \frac{1 + RQF_k(t_{j,k})}{1 + RQFMax_k} \right)$$

In this embodiment, $S_k(t_{i,k}, t_{j,k})$ is defined as:

$$S_k(t_{i,k}, t_{j,k}) = J(W(t_{i,k}), W(t_{j,k})) QF_k(t_{j,k}) IDF_k(t_{j,k})$$

In this definition, $t_{i,k}$ comes from the tuple, while $t_{j,k}$ comes from the query. Note that in the limit when $t_{i,k}$ is very close to $t_{j,k}$, $S_k(t_{i,k},t_{j,k})$ degenerates to $QF_k(t_{j,k})$*$IDF_k(t_{j,k})$.

Extensions of QF for Numerical Data

In one embodiment, query frequency is used to analyze numerical values. For example, in the realtor database, if prices near the region of $300 k are very frequently specified by workload queries, it is reasonable to treat them as important values during similarity computations. To compute $QF_k(t_{i,k})$ for values $t_{i,k}$ of numeric attribute $A_k$, the number of queries is counted that specify a range [lb, ub] for $A_k$, and for which $t_{i,k}$ belongs in [lb, ub]. This can be very inefficient in the case that attribute $A_k$ contains many distinct values. However, basically the same effect can be obtained with improved efficiency by sorting attribute $A_k$ as well as all the ranges on $A_k$ that are specified in the workload, and merging the two sorted sequences.

Deriving Attribute weights $W_k$ from the Workload

In addition to the similarity coefficients $S_k( )$, the disclosed method can also derive reasonable values of $w_k$ (i.e. attribute weights) from the workload. Let $RQF_k$ be the number of times attribute $A_k$ has been specified in the workload. In one embodiment of the method importance is given to the attribute as a whole, and not any of its specific values. In this embodiment, the attribute weights $w_k$=(1+$RQF_k$)/$\Sigma_i$(1+$RQF_i$). Giving importance to the attribute as a whole is practical in many situations. For example, in an automobile database, suppose MFR is an important attribute because it has been often specified in workload queries. If a new car manufacturer is added to the database, it automatically gets importance, even though it clearly may not appear in the workload.

Missing Attributes

Missing attributes are handled by ranking tuples higher if their missing attribute values occur more frequently in the database or the workload. In particular, we use the sum of $QF_k(t_k)$*$DF_k(t_k)$ to rank each tied tuple t.

Implementation Issues

In the worst case, storing the similarity $S_k(t_{i,k},t_{j,k})$ for a query and all the tuples may require space quadratic in the size of $A_k$'s domain. However, in practice the number of distinct values referenced in a workload is much smaller than the number of distinct values in the database. In addition, in the exemplary embodiment only the coefficients with values above a certain threshold are stored. In the exemplary embodiment, the coefficients are stored in an auxiliary database table. These quantities can be efficiently computed using a frequent itemset algorithm. One such algorithm is disclosed in R. Agrawal, H. Mannila, R. Srikant, H. Toivonen and A. I. Verkamo: "Fast Discovery of Association Rules", Advances in Knowledge Discovery and Data Mining, 1995.

Query Processing—Retrive Top-K Results

Referring to FIG. 3, in the disclosed method the similarity function, the database records and an incoming query are provided to a top-K algorithm 118 that returns 120 the top-K tuples.

One aspect of the ranking problem in the database context is the efficiency of producing a ranked answer at runtime when a query is posed. This is known as the Top-K problem where the ordering is performed by the ranking function. In recent years efficient algorithms have been proposed to answer Top-K queries over the database ranking functions that satisfy a set of constraints on the ranking function. The disclosed ranking inverse document frequency similarity and/or query frequency similarity functions respect these constraints. The disclosed method can use the known Top-K query processing algorithms. Thus, in the exemplary embodiment the disclosed techniques build on the functionality available in SQL databases without requiring any core changes to the engine.

In the exemplary embodiment, the method for automated ranking of database queries has a low preprocessing cost, expands on ranking for information retrieval, and leverages Top-K query processing at runtime.

Evaluating and comparing different ranking alternatives for quality is a challenging task. The development of document ranking techniques in the area of information retrieval (IR) relies on extensive user studies and benchmarks. This information is not available today for database ranking. The included experimental examples compare the quality of ranking obtained by the disclosed ranking techniques. Also included are experiments that study the preprocessing as well as runtime cost of using the disclosed ranking techniques.

In this section the method assumes that a similarity function has been successfully extracted by one or more of the algorithms discussed above or another similarity function has been extracted from the database or workload. This section discloses how top-K queries are answered. As mentioned above, the top-K problem has been investigated in recent years, and various techniques have been developed that often perform better than linear scan. One category of techniques builds specialized indexes that can be used for arbitrary similarity spaces. For example, C. Faloutsos, C. and K-I. Lin. Fastmap; *a Fast Algorithm for Indexing, Data mining and Visualization of Traditional and Multimedia Datasets*. SIGMOD 1995 discloses a Fast-Map technique, P. Ciaccia, M. Patella and P. Zezula; M-tree. *An Efficient Access Method for Similarity Search in Metric Spaces*. VLDB 1997 discloses a M-tree technique, and T. Bozkaya and M. Ozsoyoglu. *Indexing Large Metric Spaces for Similarity Search Queries*. ACM TODS, 1999 discloses a VA-tree technique. In the exemplary embodiment, the disclosed method enables support for ranking on any traditional SQL DBMS. In one embodiment, the method only assumes the presence of native indexes such as B+ trees.

In the exemplary embodiment, a technique, such as the techniques disclosed in R. Fagin, *Fuzzy Queries in Multimedia Database Systems*, PODS 1998 and R. Fagin, A. Lotem and M. Naor, *Optimal Aggregation Algorithms for Middleware*, PODS 2001 is used for the top-K problem. These algorithms do not require the construction of specialized indexes. However they require that the similarity function satisfy certain monotonic properties. In the exemplary embodiment, the disclosed method adopts a top-K algorithm called the threshold algorithm (TA) disclosed in the Optimal Aggregation Algorithms for Middleware reference.

A description of the functionality of the threshold algorithm TA follows. Consider a database R with the following properties. The set of attribute values Vk of each attribute Ak is orderable from largest to smallest. The database can be accessed in two modes: (i) sorted access, where if Lk defines a sorting of the database by attribute Ak, it is possible to efficiently retrieve the tuples in this order, and (ii) random access, where given an attribute value vk, it is possible to efficiently retrieve the remaining attribute values of a tuple that has Vk in its kth attribute. Let grade(t) be any monotone real-valued function defined over the tuples (i.e., if ti=<ti,1, . . . , ti,m> and tj=<tj,1, . . . , tj,m> are two tuples such that ti,k≦tj,k for all 1≦k≦m, then grade(ti)≦grade (tj)). Given such a database, the algorithm TA is able to retrieve the K tuples with the highest grades by making a small number of sorted accesses and random accesses.

In the exemplary embodiment, the threshold algorithm is used to return the top-K results. For illustrative purposes, assume that the query vector Q=<$s_1$, . . . , $s_m$> where each $s_i$ is a single value. The cases of $s_i$ having multiple values, as well as missing attributes, are readily understood by those skilled in the art. A similarity database $R_s$ may be defined as follows: each tuple t=<$t_1$, . . . , $t_m$> in R is mapped to a similarity tuple t'=<$S_1(s_1,t_1), S_2(s_2,t_2), \ldots, S_m(s_m,t_m)$> in $R_S$. The attribute values of database $R_s$ are orderable. In the exemplary embodiment, $R_s$ is never actually materialized and query processing is done over the original database R. For a tuple t' in database $R_s$, let grade(t') be defined as $w_1 S_1(s_1, t_1) + \ldots + w_m S_m(s_m, t_m)$. In this embodiment, grade (t') is monotonic.

In the exemplary embodiment, the implementations of sorted access and random access are considered. Since $R_s$ is never materialized, these operations are implemented directly on R. For illustrative purposes, assume that there are indexes on each of the attributes of R (including the primary key, say a TupleId column). Random access can be efficiently simulated as follows: given any tupleid of R, the method can look up this index and retrieve the entire tuple (and thus all its attribute values).

The method also considers sorted access. Query frequency similarity is discussed. It should be readily apparent to those skilled in the art that sorted access for query frequency can easily be extended to inverse document frequency, since IDF similarity is simpler. Let v be the value of attribute $A_k$ of the query vector. Let {v, $v_1$, $v_2$, . . . } be the list of the attribute values of $A_k$, sorted by decreasing similarity from v. This list can be constructed from the auxiliary table that contains pair-wise similarities between attribute values. The overall idea is to first retrieve all tuples with value v in $A_k$, then those with value $v_1$ in $A_k$, and so on. This entire operation can be implemented by SQL statements that access the auxiliary table and R.

Combining IDF, QF and Top-K

Figure 6:
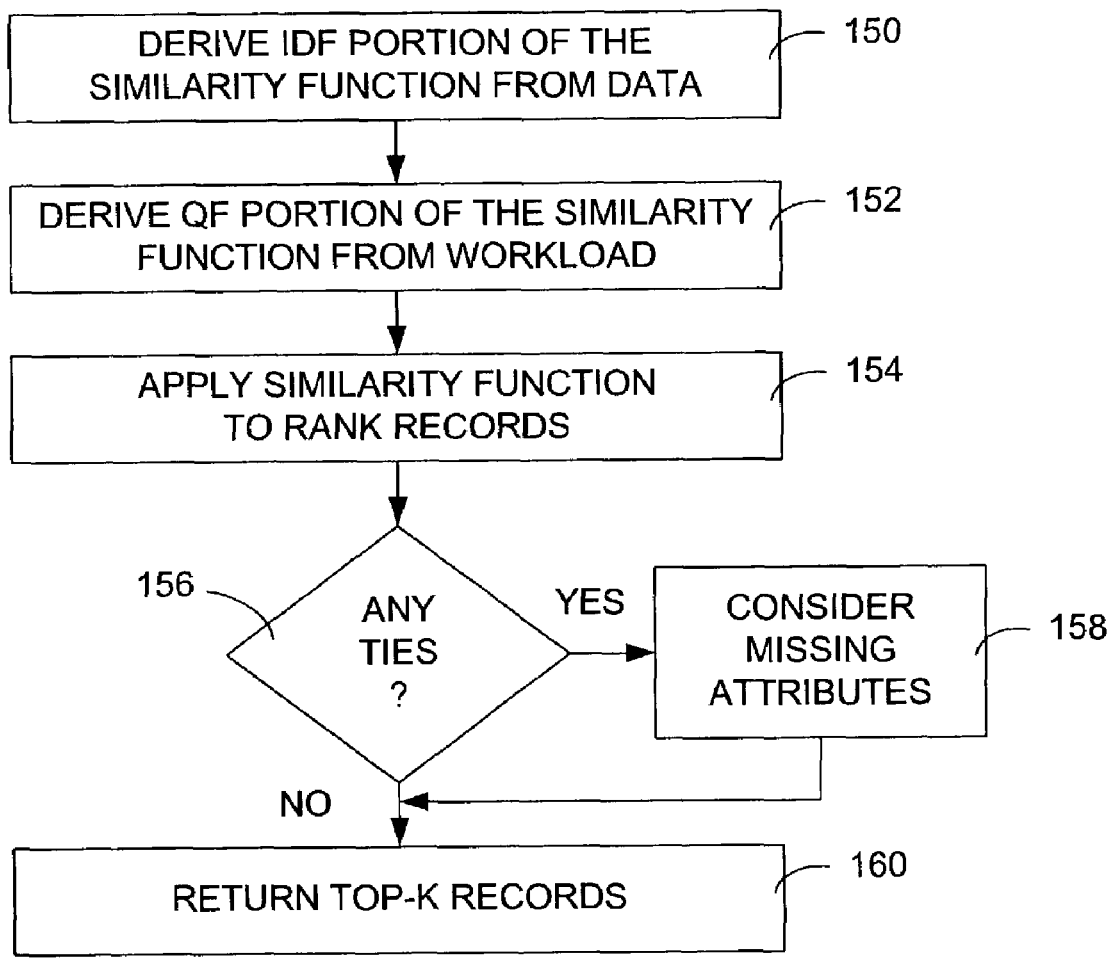
FIG. 6 is a flow chart that illustrates one method of returning top-K records for a given query.

FIG. 6 is a flow chart that illustrates one method for automatically deriving a similarity function, applying the similarity function and returning the top-K results. In a preprocessing phase of this embodiment, an IDF portion of the similarity function is derived 150 from data in the database 18 and a QF portion of the similarity function is derived 152 from the workload 102. In this embodiment, categorical and numeric data are accounted for in the IDF and QF portions of the similarity functions. In a query processing portion of the method, the similarity function is applied 154 to rank the records in the database. Referring to FIG. 3, the similarity function is provided to the top-K algorithm along with an incoming query and database records. The top-K algorithm applies the similarity function to rank the records. In the embodiment illustrated by FIG. 6, the method determines 156 whether any of the records have the same similarity or relevance score. If two or more records have the same similarity score, the method considers database attributes that are not included in the incoming query. Records with attribute values that are commonly specified by queries in the workload or that occur often in the database are ranked higher than records with attribute values that rarely occur in the workload or the database. The method then returns 160 the top-K records.

Examples of Experiments

The techniques described in this disclosure were implemented and experiments were conducted to evaluate their effectiveness. The experiments were run on a machine with an x86 450 MHz processor with 256 MB RAM and an internal 5GB hard drive running Microsoft Windows 2000 and SQL Server 2000. The following algorithms and variants were tested: Cosine (C), IDF, and QF. Note that Cosine is basically the IDF Similarity algorithm without the IDF scaling factor. The quality as well as performances of these three algorithms was compared. An adaptation of the TA algorithm was tested for query processing using these similarity techniques.

Summary of Results:
Quality Results
Among the similarity algorithms, the best in quality of rankings is the combined IDF-QF algorithm, followed by IDF, and then Cosine. Explicitly incorporating domain knowledge outperforms all automated algorithms in quality.
The variant of QF that scales Cosine with the QF*IDF factor produces the best rankings.

Discarding small QF counts has very little impact on the ranking quality of QF.

Performance Results

The preprocessing time and space requirements of all our techniques scale with increasing data size.

The adaptation of the TA algorithm for query processing is efficient for all the disclosed similarities.

Quality Experiments

The ranking quality of the disclosed algorithms was evaluated on several real databases and workloads, as well as some synthetic databases and workloads.

Quality Experiments on Real Databases

User studies were conducted on real databases in order to evaluate the quality of the ranked results by the disclosed algorithms. An algorithm Random (R) that retrieves a random set of K tuples from the database was tested, mainly as a validity check of the evaluation procedure.

Databases and Workloads: Two small real databases were used for the experiments. These databases (a) contain a good mix of categorical and numeric attributes, (b) contain a rich and varied set of tuples, yet are small enough to allow relatively easy browsing and scoring by the users of the experiments, and (c) do not require highly specialized domain knowledge to understand the databases, which simplified the task of finding human subjects to participate in the experiments.

Automobile Database: The first real database was the Automobile database from the UCI Machine Learning Repository (http://www.ics.uci.edu/~mlearn/MLRepository.html). The database contains 205 tuples and 26 attributes. For the experiment, 12 intuitive attributes were kept: 7 categorical (make, fuel, aspiration, number of doors, body style, drive wheels, and engine location), and 5 numerical (engine size, horsepower, city mpg, highway mpg, and price).

Automobile Workload: For building a workload, seven people were asked to provide queries that they would do if they wanted to buy a car, or if they were just browsing the database. Examples of typical queries were: "SELECT * FROM automobile WHERE price <20000 AND horsepower >150" and "SELECT * FROM automobile WHERE body_style='convertible' AND price>30000". In general people queried about specific car characteristics in certain price ranges, or explored various trade-offs, e.g. economy versus power. We collected a total of 65 queries which became the "master" workload. In the experiments, workload sizes were varied by using different subsets of the master workload.

Realtor Database: The second database was a real estate database with information about homes for sale in Seattle Eastside that were collected from http://www.realtor.com. The database contained 174 tuples (i.e. homes) and had 12 attributes, 5 of which are categorical (City, Zipeode, Deck, Fenced, Cul-de-sac) and 7 are numerical (Price, Datebuilt, Bedrooms, Bathrooms, Garages, Sq-Ft, Acerage).

Realtor Workload: Six people helped provide us with a total of 52 queries. Examples of typical queries were: "SELECT * FROM homes WHERE Bed>2 AND Bath>1.5 AND Garage>1 AND Price<350000" (the user commented he had in mind young families with not too much money, but have children and hence need space) or "SELECT * FROM homes WHERE City IN ('REDMOND', 'BELLEVUE') AND Cul-de-sac=Yes" (someone looking for a quiet place in a prime location).

Evaluating Ranking Quality R and C Metrics: When algorithms were run on several test queries, the resulting rankings appeared intuitive and reasonable. For example, in the Realtor database query frequency gave preference to number of bedrooms (there were many workload queries that referenced bedrooms), while IDF gave preference to certain zip codes.

The ranking quality was evaluated by measuring the degree of human agreement with the ranked lists produced by the algorithms. Five people, different from the people that provided the workload were surveyed. For both databases a mix of 10 test queries similar to the ones provided by users in the workload phase were selected. In an ideal situation each subject would mark all the tuples in the database. However, this would have been very tedious, so the following strategy was used. For each test query $Q_i$ a list $H_i$ of 25 potential result tuples was generated as follows: to each tuple in the database a score ⅓*(SIMIDF+SIMQF+r) was assigned, where SIMIDF and SIMQF were the normalized similarities between the tuple and the query by the IDF and the QF algorithms respectively, and r was a random number between 0 and 1. The 25 tuples with the highest score were selected and randomly permuted. Thus, these 25 tuples are likely to contain a healthy mix of "relevant" and "irrelevant" tuples to the query. The queries were presented along with the corresponding lists to each person in our user study. Each user's responsibility was to mark each tuple in $H_i$ as relevant or irrelevant to the query $Q_i$. The algorithms were then run against the test queries. In order to evaluate the ranked list produced a standard collaborative filtering metric R was used. Details of this metric are disclosed in J. Breese, D. Heckerman and C. Kadie. Empirical Analysis of Predictive Algorithms for Collaborative Filtering. 14th Conference on Uncertainty in Artificial Intelligence, 1998.

$$R = \frac{1}{R_{\max}} \sum_i \frac{t_i}{2^{(i-1)(\beta-1)}}$$

In the formula for the R metric, $t_i$ is the subject's preference for the ith tuple in the ranked list (1 if it is marked relevant, and 0 otherwise), and $\beta$ is the half-life parameter which models the position of the item in the list such that there is a 50-50 chance the expert will review that item. In the experiments, $\beta$ was set to 10. Rmax is the score that would have been achieved if all tuples in the answer were marked as relevant.

One reason for having the lists $H_i$ is because it is to tedious to have the subjects mark the whole database. Therefore a tuple ranked high by an algorithm might be relevant but it might not appear in the corresponding list $H_i$. In this case, it is assumed that information for that tuple is not available, and the tuple is ignored. For this reason, R could be 1 in cases that the ranking produced by an algorithm has a very small intersection with the list $H_i$ (e.g. one tuple which happens to be marked relevant).

To measure this undesired effect, the cover metric C of the output of a query by list $H_i$ was computed:

$$C = \frac{|A \cap L_i|}{|A|}$$

Here A is the output of the algorithm for that query execution. In other words, the metric R measures the quality of the algorithms, while the metric C is designed to measure the credibility of the values of R.

R and C Metrics versus Precision and Recall: The definitions of R and C are not the same as standard notions of precision and recall in information retrieval. R was used instead of precision because it is more appropriate for evaluating rankings, and recall could not be used because the whole database could not be marked.

Quality Results on Real Databases

Figure 7:
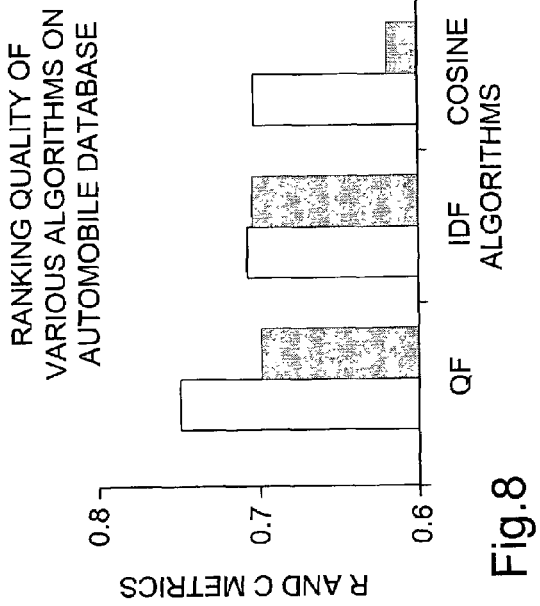
FIG. 7 is a graph that illustrates ranking quality of various algorithms on a test database.
Figure 8:
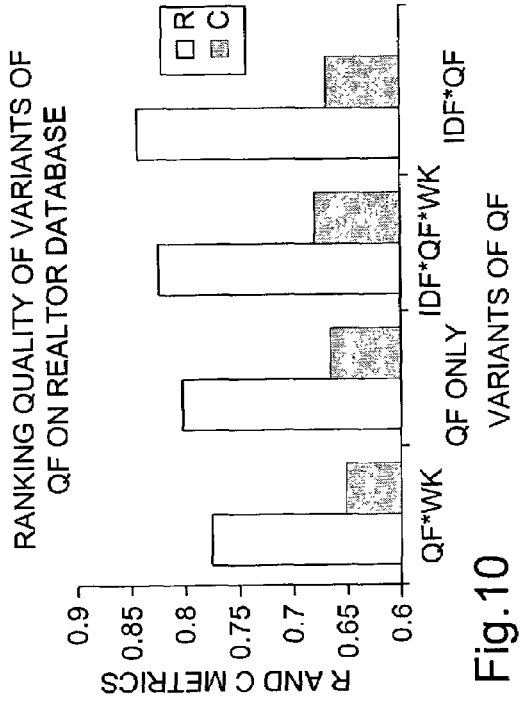
FIG. 8 is a graph that illustrates ranking quality of various algorithms on a test database.

Quality of Different Algorithms: In FIGS. 7 and 8 the average R and C metrics are presented for each algorithm on the test queries, for both of the real datasets. The average quality of QF similarity is better than that of IDF Similarity, which is better than that of Cosine Similarity. Random is not shown in the charts as it performed very poorly, as expected (R=0.18 and C=0.16 for the Realtor database, and R=0.26 and C=0.12 for the Automobile database).

Figure 9:
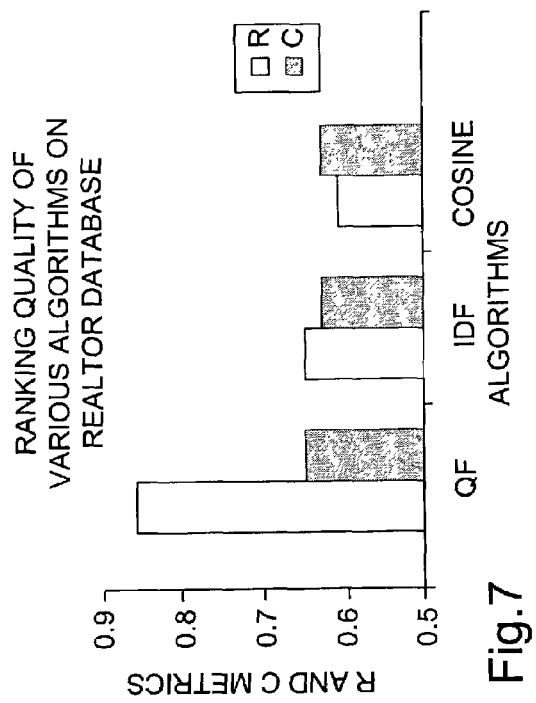
FIG. 9 is a graph that illustrates ranking quality of QF similarity on a test database for various workload sizes.

Quality versus Workload Size: The dependence of quality to workload size in the QF Similarity algorithm is explored. QF Similarity was run on randomly sampled fractions of the master workload on the Realtor database. The results shown in FIG. 9 indicate that larger workloads lead to better quality. In the graph, the entry corresponding to QF with no workload at all is identical to IDF.

Figure 10:
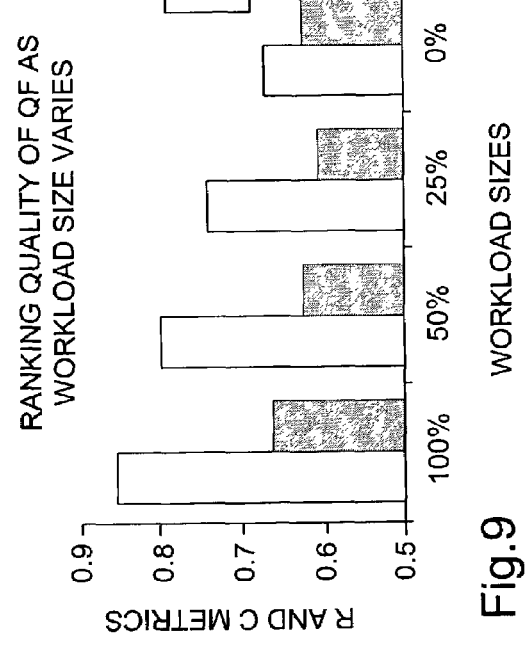
FIG. 10 is a graph that illustrates ranking quality of QF similarity variants on a test database.

Different Variants of QF: The experiment was conducted with the following variations of the QF algorithm:

QF: scaling factor is QF*IDF
QF-only: scaling factor is QF only
QFw: scaling factor is QF*IDF*$w_k$
QFw-only: scaling factor is QF*$w_k$ The results are shown in FIG. 10. It was found that scaling with IDF enhances the quality in all cases, while using the attribute weights $w_k$ did not greatly enhance the results.

Domain Knowledge: In the Realtor database an opportunity was found to experiment with the disclosed algorithms. For the categorical attributes city names and zipcodes, a map was used to obtain approximate distances d(A,B) for every pair of cities/zipcodes. Then for every pair of cities/zipcodes the similarity $S_k(A,B)$ was set appropriately. This enhancement achieved ranking quality of R=0.88 and C=0.73, thereby outperforming all the automated algorithms.

Quality Experiments on Synthetic Databases

In the exemplary embodiment, only QF counts that are larger than a given support threshold are kept. In this experiment, the main objectives were to study how such approximations to QF impact ranking quality. For these experiments synthetic databases and workloads were generated. A publicly available program (see S. Chaudhuri and V. Narasayya, *Program for TPC-D Data Generation with Skew, http://research.microsoft.com/dmx/AutoAdmin.)* was used for generating popular TPC-R databases with differing data skew. For the experiments a lineitem fact table of 600 K rows with varying skew parameter z was generated. Here results for z=2.0 are reported (similar results occurred for values of z from 0.5 to 3). All 17 attributes were treated as categorical. There are 6 attributes with less than 10 distinct values, 3 attributes with order of tens of distinct values, 5 attributes with hundreds, and 3 with thousands.

The quality of QF algorithm was tested when counts below a given support parameter T discarded. The experiment examined how close the rankings produced by the approximate version are to the exact version of the algorithm (i.e., for this experiment it is assumed that the exact version generates "perfect" rankings). For uniformity, the same methodology used in the real datasets was followed. Instead of actually generating a random workload, QF counts were set for single values randomly from a Zipfian distribution. In a similar way, QF counts were generated for pairs of attribute values. Test queries are generated as selection conjunctions with three to seven randomly picked attributes. For each test query, the exact version of QF was run first. The first K tuples returned are marked as "relevant" and all other tuples as "irrelevant". Next, the approximate version of QF was run for the same queries and the value of R metric computed. Notice that the value of C metric is always 1 since the whole database is marked. T is expressed as a fraction of the maximum count appearing in the database. In the experiments K was set to K=100.

Figure 11:
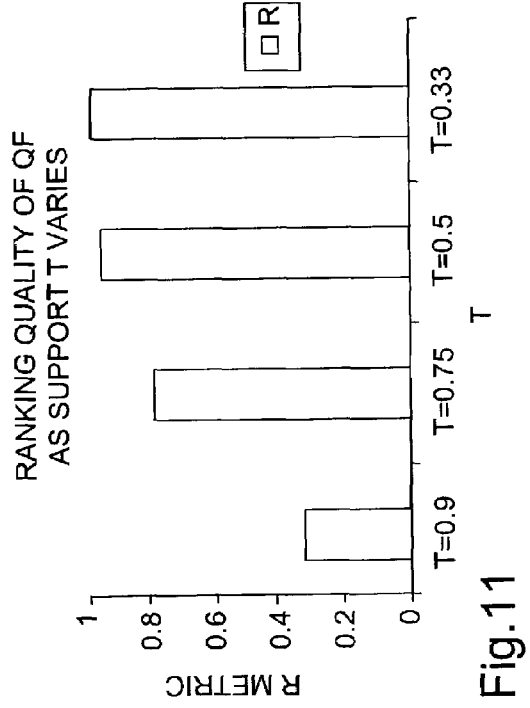
FIG. 11 is a graph that illustrates ranking quality of QF similarity as for various threshold values.

FIG. 11 shows how R varies with T. It was noticed that even for values of T as large as 0.5 where very few counts are kept (recall that the counts are generated according to a Zipfian distribution) values of R close to 1 are achieved.

Performance Experiments

The preprocessing as well as query processing performance was evaluated of the ranking algorithms. For this set of experiments, the TPC-R database described above was used (and report results for z=2), and also synthetic workloads were generated.

Preprocessing Performance Experiments

The space and time behavior of the IDF and QF Similarity algorithms are investigated, since these algorithms require non-trivial preprocessing.

IDF Similarity: For the IDF algorithm the frequency of each term appearing in the main table is computed, and stored in auxiliary tables. The preprocessing time is not reported, as it is quite efficient (proportional to a scan of the database table, plus O(n) updates to the auxiliary tables where the frequencies are stored). The space taken up by these auxiliary tables is 26% of the TPC-R database (z=2). In practice many of these counts do not have to be computed as they are often already available in histograms.

QF Similarity: Preprocessing performance experiments were not conducted on QF similarity, as it is not expected to have significantly additional space and time requirements compared to IDF. The extra time is spent in parsing the workload which is orders of magnitude smaller than the database. The extra space is also negligible as not many pairs of values have frequencies beyond the support threshold parameter T.

Query Processing Performance Experiments

In this experiment, TA viz. TA-COS was implemented for Cosine, TA-IDF was implemented for IDF and TA-QF was implemented for QF similarity. For comparison, a Linear Scan algorithm was implemented for retrieving the top-K tuples for the similarity functions. All tests were performed on the TPC-R database described above.

Figure 12:
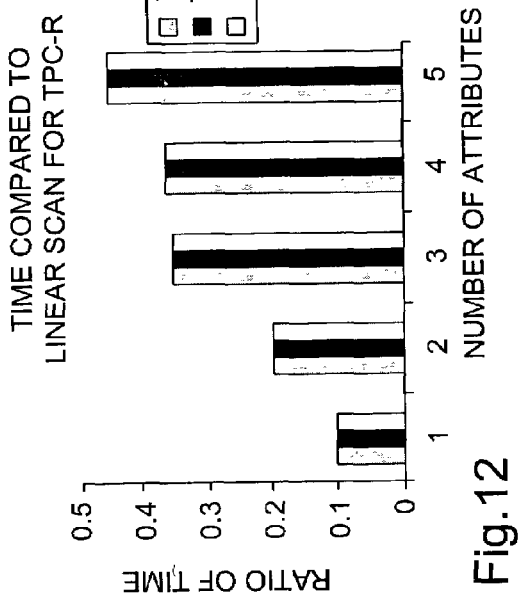
FIG. 12 is a graph that illustrates an execution time compared to linear scan for various numbers of attributes.

Varying Number of Attributes in Query: 5 workloads W-1 through W-5 of 100 queries each were generated where each query in W-i referenced i attributes. The attributes and values in a query were randomly selected from the underlying database. As FIG. 12 shows, the query performance of all the three techniques was almost identical.

Figure 13:
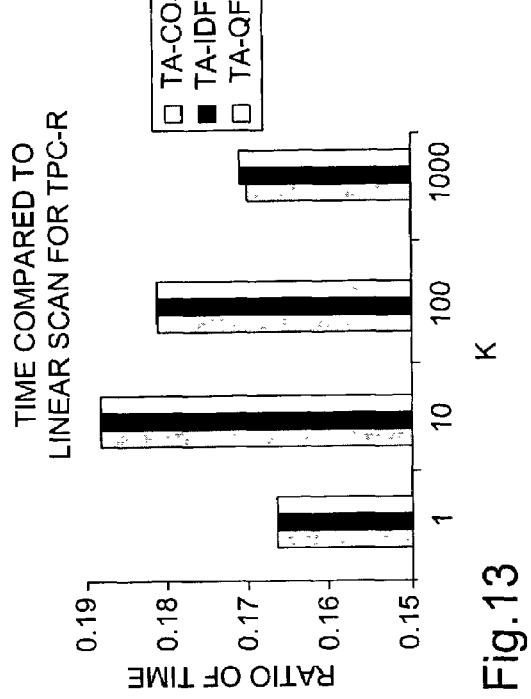
FIG. 13 is a graph that illustrates an execution time compared to linear scan as K varies.

Varying K in Top-K: Here, a workload with 100 queries was used. The number of attributes in a query was randomly selected between 1 and 5. FIG. 13 shows that all the techniques had almost identical performance (Cosine was slightly faster than IDF and QF as it involves the least processing during querying) and outperformed linear scan by almost a factor of 5.

We claim:

1. A computer implemented method for automatically ranking data records by relevance to a query on a database the method comprising:

deriving a similarity function of the form $$SIM(t, Q) = \sum_{k=1}^{m} w_k \min_{v \in T_k} \{S_k(t_k, v)\}$$

from at least one of data records in a database and a workload of queries, wherein t represents a tuple, Q represents a query, w represents an attribute weight, $T_k$ represents a set of constraints on values for categorical attributes or a range for numeric attributes, S represents a similarity coefficient, and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a query frequency between the given query and the records in the database;

ranking the records in the database based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

2. The method of claim 1 wherein the similarity function is derived only from at least one of data in the database and the workload of queries.

3. The method of claim 1 wherein the given query is a conjunctive condition.

4. The method of claim 1 wherein the similarity function corresponds to an inverse frequency of attribute values in records of the database.

5. The method of claim 1 wherein the similarity function includes a cosine similarity between attributes specified in the given query and the database records.

6. The method of claim 1 wherein the similarity function corresponds to a frequency an attribute value is specified in queries in a workload.

7. The method of claim 1 wherein the similarity function corresponds to a frequency that a categorical attribute value is specified in queries in a workload and a frequency that a numeric attribute value and nearby numeric attribute values are specified in queries in the workload.

8. The method of claim 1 wherein the similarity function assigns an importance weight to an attribute based on a frequency at which the attribute is specified by queries in the workload.

9. The method of claim 1 wherein the similarity function ranks a first record having a same similarity score as a second record higher than the second record when values in the first record for attributes that are not specified in the given query occur more frequently in the workload queries than corresponding attribute values in the second record.

10. The method of claim 1 further comprising filtering the returned records using the given query when a condition of the given query includes an inflexible condition to remove records that do not satisfy the inflexible condition.

11. The method of claim 1 wherein the given query is an inflexible conjunctive condition and the returned records are filtered using the conjunctive condition to remove records that do not satisfy the given query.

12. The method of claim 1 wherein database records and the similarity function are provided to a top-K algorithm that returns a top-K number of records in the ranked order.

13. The method of claim 12 wherein a threshold algorithm is used to return the top-K results.

14. A method for automatically ranking data records by relevance to a query on a database wherein the database has data records arranged in one or more database tables, the method comprising:

deriving an inverse document frequency similarity function of the form $$SIM(t, Q) = \sum_{k=1}^{m} w_k \min_{v \in T_k} \{S_k(t_k, v)\}$$

from the data records in a database, wherein t represents a tuple, Q represents a query, w represents an attribute weight, $T_k$ represents a set of constraints on values for categorical attributes or a range for numeric attributes, S represents a similarity coefficient, and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a similarity between the given query and the records;

ranking the records based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

15. A method for automatically ranking data records by relevance to a query on a database wherein the database has data records arranged in one or more database tables, and wherein the database has a given workload comprising a set of queries, the method comprising:

deriving a query frequency similarity function of the form $$SIM(t, Q) = \sum_{k=1}^{m} w_k \min_{v \in T_k} \{S_k(t_k, v)\}$$

from the queries in the workload, wherein t represents a tuple, Q represents a query, w represents an attribute weight, $T_k$ represents a set of constraints on values for categorical attributes or a range for numeric attributes, S represents a similarity coefficient, and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a similarity between the given query and the records;

ranking the records based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

16. A method for automatically ranking data records by relevance to a query on a database wherein the database has data records arranged in one or more database tables, and wherein the database has a given workload comprising a set of queries, the method comprising:

deriving a similarity function of the form $$SIM(t, Q) = \sum_{k=1}^{m} w_k \min_{v \in T_k} \{S_k(t_k, v)\}$$

that corresponds to an inverse frequency of attribute values in records of the database and a frequency an attribute value is specified in queries in a workload, wherein t represents a tuple, Q represents a query, w represents an attribute weight, $T_k$ represents a set of constraints on values for categorical attributes or a range for numeric attributes, S represents a similarity coefficient, and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a similarity between the given query and the records;

ranking the records based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

17. A computer readable medium having computer executable instructions stored thereon for performing a method for automatically ranking data records by relevance to a query on a database wherein the database has data records arranged in one or more database tables, the method comprising:

deriving a similarity function of the form $$SIM(t, Q) = \sum_{k=1}^{m} w_k \min_{v \in T_k} \{S_k(t_k, v)\}$$

from at least one of data in a database and a workload of queries, wherein t represents a tuple, Q represents a query, w represents an attribute weight, $T_k$ represents a set of constraints on values for categorical attributes or a range for numeric attributes, S represents a similarity coefficient, and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a similarity between the given query and the records;

ranking the records based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

18. The computer readable medium of claim 17 wherein the similarity function is derived only from at least one of data in the database and the workload of queries.

19. The computer readable medium of claim 17 wherein the given query is a conjunctive condition.

20. The computer readable medium of claim 17 wherein the similarity function corresponds to an inverse frequency of attribute values in records of the database.

21. The computer readable medium of claim 17 wherein the similarity function includes a cosine similarity between attributes specified in the given query and the database records.

22. The computer readable medium of claim 17 wherein the similarity function corresponds to a frequency an attribute value is specified in queries in a workload.

23. The computer readable medium of claim 17 wherein the similarity function corresponds to a frequency that a categorical attribute value is specified in queries in a workload and a frequency that a numeric attribute value and nearby numeric attribute values are specified in queries in the workload.

24. The computer readable medium of claim 17 wherein the similarity function assigns an importance weight to an attribute based on a frequency at which the attribute is specified by queries in the workload.

25. The computer readable medium of claim 17 wherein the similarity function ranks a first record having a same similarity score as a second record higher than the second record when values in the first record for attributes that are not specified in the given query occur more frequently in the workload queries than corresponding attribute values in the second record.

26. The computer readable medium of claim 17 further comprising filtering the returned records using the given query when a condition of the given query includes an inflexible condition to remove records that do not satisfy the inflexible condition.

27. The computer readable medium of claim 17 wherein the given query is an inflexible conjunctive condition and the returned records are filtered using the conjunctive condition to remove records that do not satisfy the given query.

28. The computer readable medium of claim 17 wherein database records and the similarity function are provided to a top-K algorithm that returns a top-K number of records in the ranked order.

29. The computer readable medium of claim 28 wherein a threshold algorithm is used to return the top-K results.

30. A computer readable medium having computer executable instructions stored thereon for performing, a method for automatically ranking data records by relevance to a query on a database wherein the database has data records arranged in one or more database tables, the method comprising:

deriving an inverse document frequency similarity function of the form $$SIM(t, Q) = \sum_{k=1}^{m} w_k \min_{v \in T_k} \{S_k(t_k, v)\}$$

from the data records in a database, wherein t represents a tuple, Q represents a query, w represents an attribute weight, $T_k$ represents a set of constraints on values for categorical attributes or a range for numeric attributes, S represents a similarity coefficient and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a similarity between the given query and the records;

ranking the records based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

31. A computer readable medium having computer executable instructions stored thereon for performing, a method for automatically ranking data records by relevance to a query on a database wherein the database has data records arranged in one or more database tables, and wherein the database has a given workload comprising a set of queries, the method comprising:

deriving a query frequency similarity function of the form $$SIM(t, Q) = \sum_{k=1}^{m} w_k \min_{v \in T_k} \{S_k(t_k, v)\}$$

from the queries in the workload, wherein t represents a tuple, Q represents a query, w represents an attribute weight, $T_k$ represents a set of constraints on values for categorical attributes or a range for numeric attributes, S represents a similarity coefficient, and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a similarity between the given query and the records;

ranking the records based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

32. A computer readable medium having computer executable instructions stored thereon for performing a method for automatically ranking data records by relevance to a query on a database wherein the database has data records arranged in one or more database tables, and wherein the database has a given workload comprising a set of queries, the method comprising:

deriving a similarity function of the form $$SIM(t, Q) = \sum_{k=1}^{m} w_k \min_{v \in T_k} \{S_k(t_k, v)\}$$

that corresponds to an inverse frequency of attribute values in records of the database and a frequency an attribute value is specified in queries in a workload, wherein t represents a tuple, Q represents a query, w represents an attribute weight, $T_k$ represents a set of constraints on values for categorical attributes or a range for numeric attributes S represents a similarity coefficient, and v represents a value of an attribute, wherein the similarity function corresponds to an inverse frequency of categorical attribute values in records of the database and an inverse frequency of numeric attribute values that is determined by considering a frequency of numeric attribute values specified in the given query and nearby numeric attribute values in the database;

applying the similarity function to a given query and records in the database to determine a similarity between the given query and the records;

ranking the records based on the similarity between the given query and the records, wherein the similarity function ranks a first record having a same similarity score as a second record higher than the second record when values in the first record for attributes that are not specified in the given query occur more frequently in the database than corresponding attribute values in the second record; and returning the records in a ranked order.

* * * * *